United States Patent [19]
Glas et al.

[11] Patent Number: 4,711,130
[45] Date of Patent: Dec. 8, 1987

[54] PRESSURE MEASURING ELEMENT

[75] Inventors: Hans J. Glas, Tamm; Hans Hecht, Korntal-Münchingen; Klaus Müller, Tamm; Kurt Spitzenberger, Weil der Stadt; Günther Stecher, Ludwigsburg, all of Fed. Rep. of Germany

[73] Assignee: Robert Bosch GmbH, Stuttgart, Fed. Rep. of Germany

[21] Appl. No.: 880,006

[22] Filed: Jun. 30, 1986

[30] Foreign Application Priority Data

Aug. 8, 1985 [DE] Fed. Rep. of Germany ....... 3528520

[51] Int. Cl.⁴ .......................... G01L 7/08; G01L 9/12; G01L 19/04
[52] U.S. Cl. ........................................ 73/708; 73/718; 73/724; 73/726; 361/283
[58] Field of Search ................. 73/708, 718, 724, 706, 73/115; 361/283

[56] References Cited

U.S. PATENT DOCUMENTS 4,198,868  4/1980  Runyan ................................. 73/708
4,481,497  11/1984  Kurtz et al. ........................... 73/708

*Primary Examiner*—Donald O. Woodiel
*Attorney, Agent, or Firm*—Michael J. Striker

[57] ABSTRACT

A pressure measuring element includes a plate-shaped substrate of ceramic material and a membrane deformable in response to pressure fluctuations. The membrane is made of ceramic material and is mounted to the upper side of the substrate. A pressure-sensitive resistor for measuring pressure is positioned inside the membrane. A heating resistor element is positioned on the underside of the substrate, which maintains the temperature of the substrate constant. A temperature sensor is also arrayed on the upper side of the substrate near the membrane.

7 Claims, 4 Drawing Figures

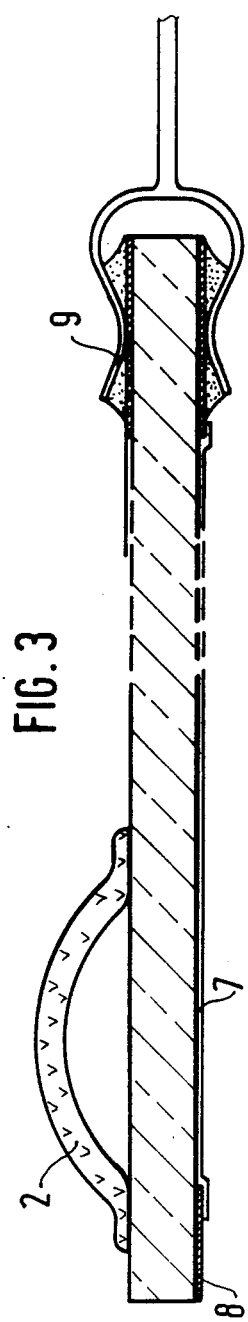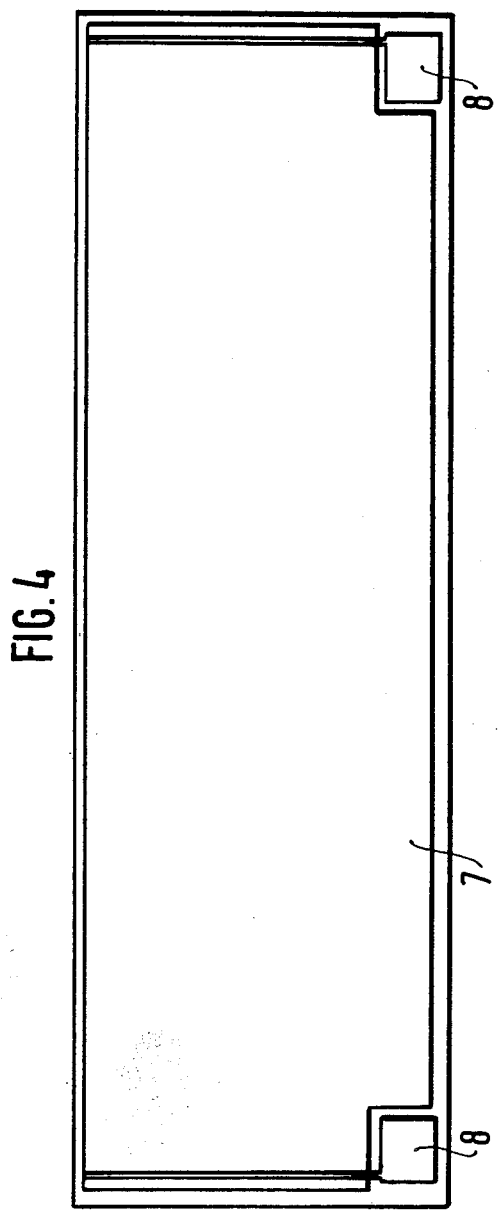

PRESSURE MEASURING ELEMENT

BACKGROUND OF THE INVENTION

The present invention relates to a pressure measuring element, particularly for measuring suction air pressure in an internal combustion engine of a motor vehicle.

Pressure measuring elements of the foregoing type include a membrane deformable in dependence upon an intake pressure, and a substrate to which the membrane is applied. Such known pressure measuring elements are very simple and are inexpensive in mass production. However, the disadvantage of such pressure measuring elements is the fact that temperature influence has negative effect on measuring results.

SUMMARY OF THE INVENTION

It is an object of the present invention to provide an improved pressure measuring element.

It is a further object of this invention to provide a pressure measuring element in which the influence of temperatures on a signal processing and signal evaluation would be avoided due to the fact that the substrate is maintained at the same temperature.

These and other objects of the invention are attained by a pressure measuring element, particularly for measuring intake air pressure in an internal combustion engine of a motor vehicle, comprising a membrane made of ceramic material and deformable in response to an intake air pressure; a substrate formed as a plate and having an upper side to which said membrane is rigidly connected at a peripheral area thereof, said substrate having an underside; and a resistance heating element mounted on said underside.

The substrate may be formed of ceramics, glass or enamelled metal.

The resistance heating element may be pressed to said substrate.

The pressure measuring element may further include at least one temperature-sensitive resistor with high temperature coefficient, arranged on said upper side and controlling current for said resistance heating element, whereby a specifically precise constant temperature of the substrate at varying environment temperatures is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a side view of the unit without a membrane, also in a schematic representation; and FIG. 4 is a plan view of the substrate of the pressure measuring element from below.

DETAILED DESCRIPTION OF THE PREFERRED EMBODIMENTS

Figure 1:
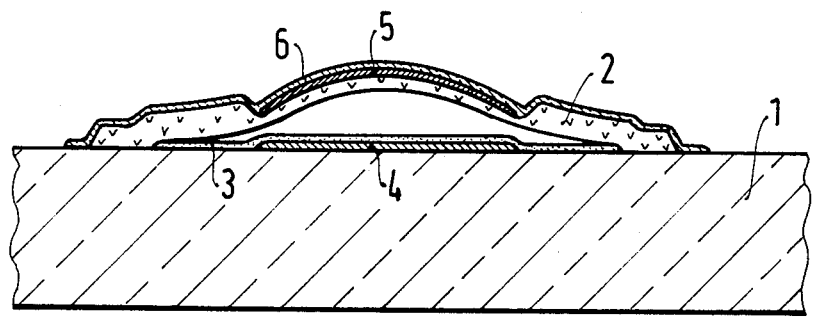
FIG. 1 is a partial sectional view of a pressure measuring element according to the invention.

Referring now to the drawings in detail, the pressure measuring element or cell shown in FIG. 1 includes a rectangular substrate plate 1 of about 1 $cm^2$ in size and made of ceramics, glass, or it may have at the upper side thereof an enamel metal plate. The pressure measuring box further includes a metal layer 4 which is applied to the substrate 1 by means of a pressure-and-burning method of a layer applying technique or by means of evaporation. Metal layer 4 is covered by a membrane 2 which is spaced therefrom in the upward direction. Membrane 2 is about 60 mm thick and has the diameter of about 0.5 cm. This membrane is formed of a ceramic material, preferably glass ceramics which is produced as a paste by a screen printing process.

In the region of the measuring element or cell, between the membrane 2 and the metal layer 4, a hollow space can be maintained. A filling material 3, for example of soot with organic additives, is superimposed on the layer 4 in that hollow space. In the next sintering process which is carried out at temperatures about 950° and in a protective gas atmosphere, this filling material prevents the adherence of the applied ceramic material of the membrane 2 to the substrate 1, and at the same time, this material sinters the ceramic material of membrane 2 into a sufficiently rigid but deformable mass. In the second burning step in the oxidized atmosphere, the filling material 3 is burned out without residues, whereby it is very important that the membrane 2 made of glass ceramics would be sufficiently thin and would not have small porosity. In the following pressure-and-burning processes, the self-supporting membrane is reinforced to a desired thickness and through the application of a further layer 6, for example amorphous glass layer, the afore-mentioned hollow space or chamber is gas-tight closed. The deformable membrane 2, exposable to underpressure and overpressure, forms a portion of the variable air capacitor. A conductive path surface 5 is applied to the membrane, which surface forms together with the metal layer 4 the capacitor.

For a precise determination and processing of measured pressure values it is expedient that the substrate plate 1 be maintained at constant temperature. For this purpose, a heating resistor element 7 is pressed to the underside of the substrate plate 1 as shown in FIGS. 3 and 4. Resistor element 7 is connected to current connections 8. By means of the resistor element 7 the substrate plate can be heated up to, for example about 90° C., which is the temperature which is above a maximal possible environment temperature. This temperature of the substrate can be maintained by the resistor element 7. The latter is applied to the side of the substrate opposite to that carrying the membrane so that the resistor element occupies the major area of the underside of the substrate. To the upper side of the substrate, on which the membrane 2 is positioned, and in immediate vicinity of the membrane, is applied one or more temperature sensors 10 with high temperature coefficient. The temperature sensor 10 is utilized as a control element for a current flowing in the resistor element 7 so that a constant temperature of the substrate plate is obtained even with varying environment temperatures.

FIG. 4 illustrates the underside of the substrate to which the resistor element 7 is screened. Electric current is fed to the resistor element via soldering pads with conductive path connections 8.

Figure 2:
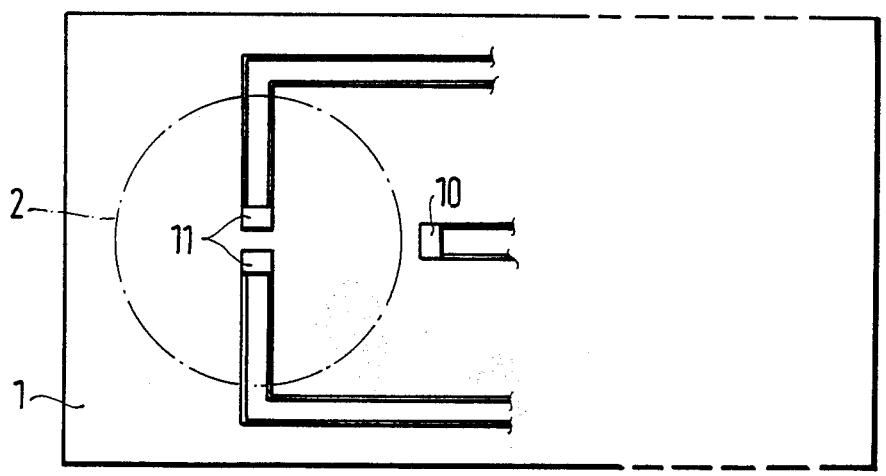
FIG. 2 is a top plan view of the pressure measuring element in a simplified illustration.

Reference numeral 11 in FIG. 2 designates a pressure-sensitive resistor or pressure sensor of the pressure measuring cell. Soldering surfaces and connection squeegees 9 are shown in FIG. 3.

The advantage of the device according to the present invention resides in that practically no temperature difference between the pressure sensor 11 and temperature sensor 10 occurs because both of them can be arranged next to each other on the substrate plate 1. A thermal coupling between the heating element, the temperature sensor and the pressure sensor is optimal because all of them are arranged on the same substrate plate. A heat output is small because thermal resistance and heat capacitance of the substrate are small.

In the exemplified embodiment shown in FIG. 1, pressure measuring unit or cell operates on the capacitive principle. It is understandable that a resistance deflection with the pressure measuring elements with other detective axle centers, for example pressure-sensitive resistances at the membrane, is also possible.

It will be understood that each of the elements described above, or two or more together, may also find a useful application in other types of pressure measuring elements differing from the types described above.

While the invention has been illustrated and described as embodied in a pressure measuring element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In a pressure measuring element, particularly for measuring intake air pressure in an internal combustion engine of a motor vehicle, comprising a membrane made of ceramic material and deformable in response to an intake air pressure; and a substrate formed as a plate and having an upper side to which said membrane is rigidily connected at a peripheral area thereof, said substrate having an underside; the improvement comprising an electrical heating resistance element mounted immediately on said underside, whereby said substrate is maintained at constant temperature.

2. The pressure measuring element as defined in claim 1, wherein said substrate is formed of ceramics.

3. The pressure measuring element as defined in claim 1, wherein said substrate is formed of glass.

4. The pressure measuring element as defined in claim 1, wherein said substrate is formed of enamelled metal.

5. The pressure measuring element as defined in claim 1, wherein said heating resistance element is pressed to said substrate.

6. The pressure measuring element as defined in claim 1, further including at least one temperature-sensitive resistor with high temperature coefficient arranged on said upper side and controlling current for said heating resistance element.

7. The pressure measuring element as defined in claim 1, wherein said heating resistance element occupies a major area of the underside of the substrate; and further including at least one temperature sensor with high temperature coefficient, which is attached to said upper side of the substrate to control said heating resistance element so that the constant temperature of the substrate is maintained.

* * * * *